United States Patent
Ward et al.

(10) Patent No.: US 9,759,274 B2
(45) Date of Patent: Sep. 12, 2017

(54) ACCESSORY TUNING DEVICE WITH SPRING LOCK

(71) Applicant: Gates Corporation, Denver, CO (US)

(72) Inventors: Peter Ward, Farmington Hills, MI (US); Joe Chen, Windsor (CA); John Harvey, Novi, MI (US); Keming Liu, Sterling Heights, MI (US)

(73) Assignee: Gates Corporation, Denver, CO (US)

( * ) Notice: Subject to any disclaimer, the term of this patent is extended or adjusted under 35 U.S.C. 154(b) by 47 days.

(21) Appl. No.: 14/713,769

(22) Filed: May 15, 2015

(65) Prior Publication Data

US 2016/0047427 A1    Feb. 18, 2016

Related U.S. Application Data

(60) Provisional application No. 62/039,413, filed on Aug. 19, 2014, provisional application No. 62/038,834, filed on Aug. 18, 2014.

(51) Int. Cl.
| | |
|---|---|
| *F16D 41/20* | (2006.01) |
| *F16D 3/12* | (2006.01) |
| *F16D 7/02* | (2006.01) |
| *F16D 43/21* | (2006.01) |
| *F16H 55/36* | (2006.01) |
| *F16D 41/22* | (2006.01) |

(52) U.S. Cl.
CPC ............. *F16D 41/206* (2013.01); *F16D 3/12* (2013.01); *F16D 7/024* (2013.01); *F16D 43/213* (2013.01); *F16D 41/22* (2013.01); *F16H 55/36* (2013.01); *F16H 2055/366* (2013.01)

(58) Field of Classification Search
CPC .. F16H 2055/366; F16D 41/20; F16D 41/206; F16D 3/12; F16D 13/76; F16F 15/1216; F16F 15/1343–15/13453; F16F 15/134
See application file for complete search history.

(56) References Cited

U.S. PATENT DOCUMENTS

| | | | |
|---|---|---|---|
| 5,156,573 A | * | 10/1992 | Bytzek .................... F02B 67/06 192/41 S |
| 6,083,130 A | | 7/2000 | Mevissen et al. |

(Continued)

FOREIGN PATENT DOCUMENTS

| | | | | |
|---|---|---|---|---|
| CN | 103790987 A | | 5/2014 | |
| DE | 10102082 A1 | * | 4/2002 | ............. F16H 55/36 |

(Continued)

OTHER PUBLICATIONS

European Patent Office, International Search Report, application No. PCT/US2015/037208, Mailing date Oct. 20, 2015.

*Primary Examiner* — Ramya Burgess
*Assistant Examiner* — David Morris
(74) *Attorney, Agent, or Firm* — Paul N. Dunlap, Esq.; Jeffrey A. Thurnau, Esq.

(57) ABSTRACT

An accessory drive tuning device with a torsion spring for angular vibration isolation and having a spring pocket that frictionally engages the end of the torsion spring. The engagement may be with a wedge-shape on either the spring end or the pocket or both, adapted so that the spring end wedges into the pocket. The engagement may be by interference fit. One or both ends of the spring may be engaged in respective pockets.

11 Claims, 14 Drawing Sheets

(56) References Cited

U.S. PATENT DOCUMENTS

| | | | |
|---|---|---|---|
| 7,207,910 B2 | 4/2007 | Dell et al. | |
| 7,712,592 B2 * | 5/2010 | Jansen | F16D 3/52 192/41 S |
| 8,678,157 B2 | 3/2014 | Ward et al. | |
| 9,341,254 B2 * | 5/2016 | Ward | F16D 41/206 |
| 2004/0092346 A1 | 5/2004 | King et al. | |
| 2007/0123380 A1 | 5/2007 | Ishida et al. | |
| 2007/0240964 A1 | 10/2007 | Saito et al. | |
| 2011/0245000 A1 | 10/2011 | Serkh et al. | |
| 2012/0100945 A1 | 4/2012 | Ishida et al. | |
| 2013/0098727 A1 | 4/2013 | Williams et al. | |
| 2013/0150191 A1 | 6/2013 | Ishida | |
| 2013/0237351 A1 * | 9/2013 | Marion | B60K 25/02 474/70 |
| 2013/0324335 A1 * | 12/2013 | Chen | F16D 41/206 474/94 |
| 2014/0329631 A1 | 11/2014 | Mevissen et al. | |
| 2015/0226309 A1 | 8/2015 | Marion | |
| 2015/0345575 A1 * | 12/2015 | Antchak | F16D 43/24 474/94 |

FOREIGN PATENT DOCUMENTS

| | | |
|---|---|---|
| JP | 2007333051 A | 12/2007 |
| JP | 2008019959 A | 1/2008 |

* cited by examiner

ACCESSORY TUNING DEVICE WITH SPRING LOCK

BACKGROUND OF THE INVENTION

This invention relates to accessory drive tuning devices with torsion springs for isolation, and in particular, devices with a self-engaging torsion spring locking feature.

This invention relates to accessory drive tuning devices with torsion springs for isolation of vibrations. These devices as commonly known in the art are alternator tuning pulleys and crankshaft tuning devices. Examples of such devices are the alternator isolator decoupler ("AID") as described for example in U.S. Pat. No. 8,678,157, the alternator isolator pulley ("AIP") as described for example in U.S. Pat. No. 7,207,910, a crankshaft isolator decoupler ("CID"), the overrunning alternator decoupler ("OAD") as described for example in U.S. Pat. Appl. Pub. No. 2013/0098727, and the crankshaft isolator pulley sold under the trade name Torqfiltr by Litens. These devices may or may not have a one-way clutch. In either case the spring may exhibit spring rattle. Spring rattle occurs when the spring is allowed to slide in and out of its pocket or away from its stop. The speed fluctuation resulting from the torsional vibration of a firing engine can cause the spring to slide out in the same or opposite direction relative to the rotating direction of the pulley. The re-engagement of the spring in the pocket or against the stop can create a noise that would be unacceptable to the customer.

SUMMARY

The present invention is directed to systems and methods which provide a solution to the problem of torsional spring rattle in accessory drive tuning devices such as decouplers or isolator pulleys. The solution is designated a "spring lock" and utilizes frictional engagement. One method of achieving a "spring lock" comprises a spring pocket adapted to wedgingly engage with a spring end. The pocket may have a wedge-shape adapted so that the spring end wedges into the pocket when biased into the pocket.

In other embodiments, the spring end may be tapered for wedging into the pocket. Both the pocket and spring end may be wedge shaped.

Another method of achieving a "spring lock" is to use an interference fit between at least a portion of the spring inner or outer diameter and a corresponding pocket surface as means of holding the spring in place.

One or both ends of the torsional spring may engage with associated pockets. When both spring ends engage with their respective pockets, the same embodiment or two different embodiments of frictionally engaging spring locks may be utilized.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

This invention relates to accessory drive tuning devices with torsion springs for isolation angular vibrations. The device may or may not have a one-way clutch, but in either case the torsional spring must be kept in position to prevent spring rattle. Spring rattle occurs when the spring is allowed to slide in and out of its pocket. The speed fluctuation resulting from the torsional vibration of a firing engine can cause the spring to slide out in a clockwise and counterclockwise direction relative to the rotating direction of the pulley. The re-engagement of the spring can create a noise that would be unacceptable to the customer. What is needed is a locking method to retain the end of the torsional spring in its pocket. To make retaining of the spring end feasible for manufacturing the locking method needs to be self engaging.

Generally, herein "isolator" is the spring function which provides relative displacement, while being still connected, and "decoupler" is the clutch function which provides an on or off connection. Also, generally "torsional vibration" refers to the twisting of the crankshaft—which is generally controlled by a crank damper, and angular vibration is the rigid body motion of the crank nose which effects the accessory belt drive system ("ABDS"). An isolator decoupler preferably works on the crank angular vibration input to the ABDS, for example, protecting the alternator, but generally not affecting the crank torsional vibration.

Figure 1:
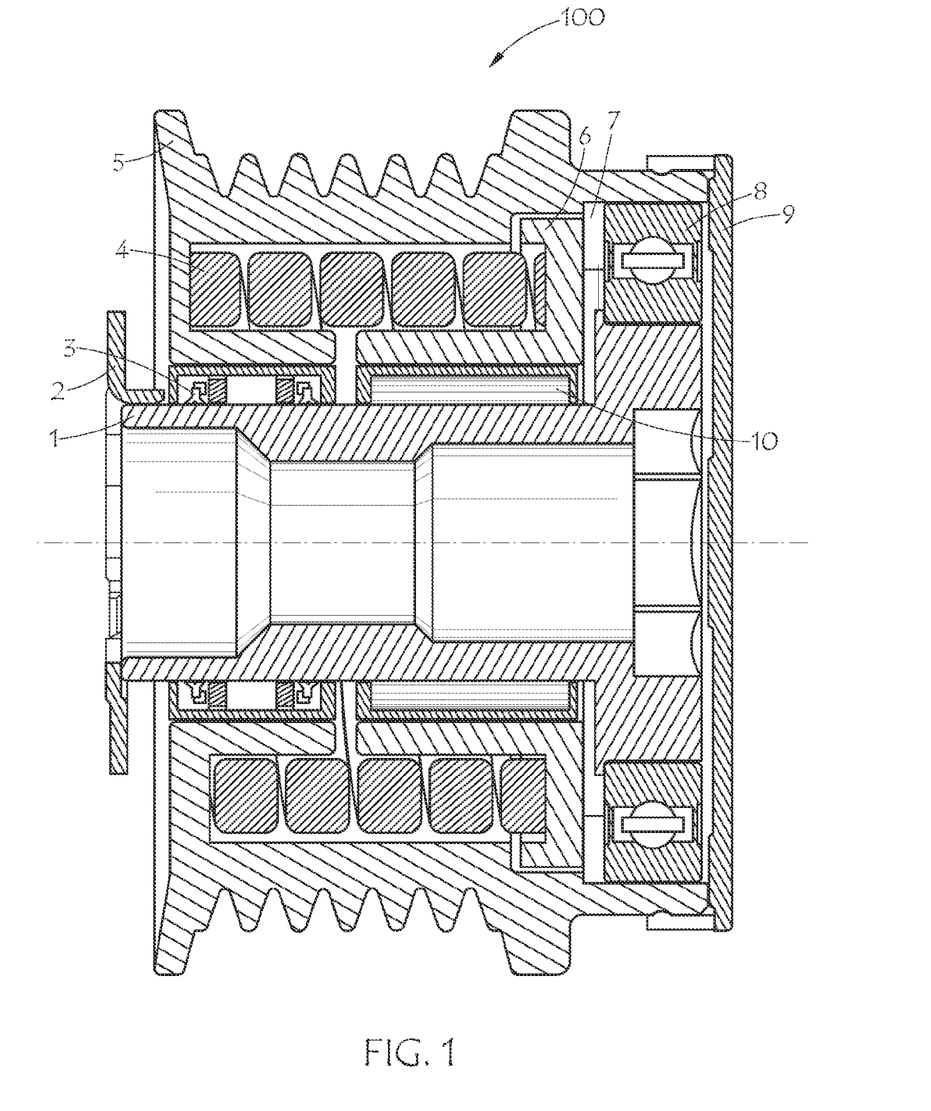
FIG. 1 is sectional view of a device according to an embodiment of the invention.
Figure 2:
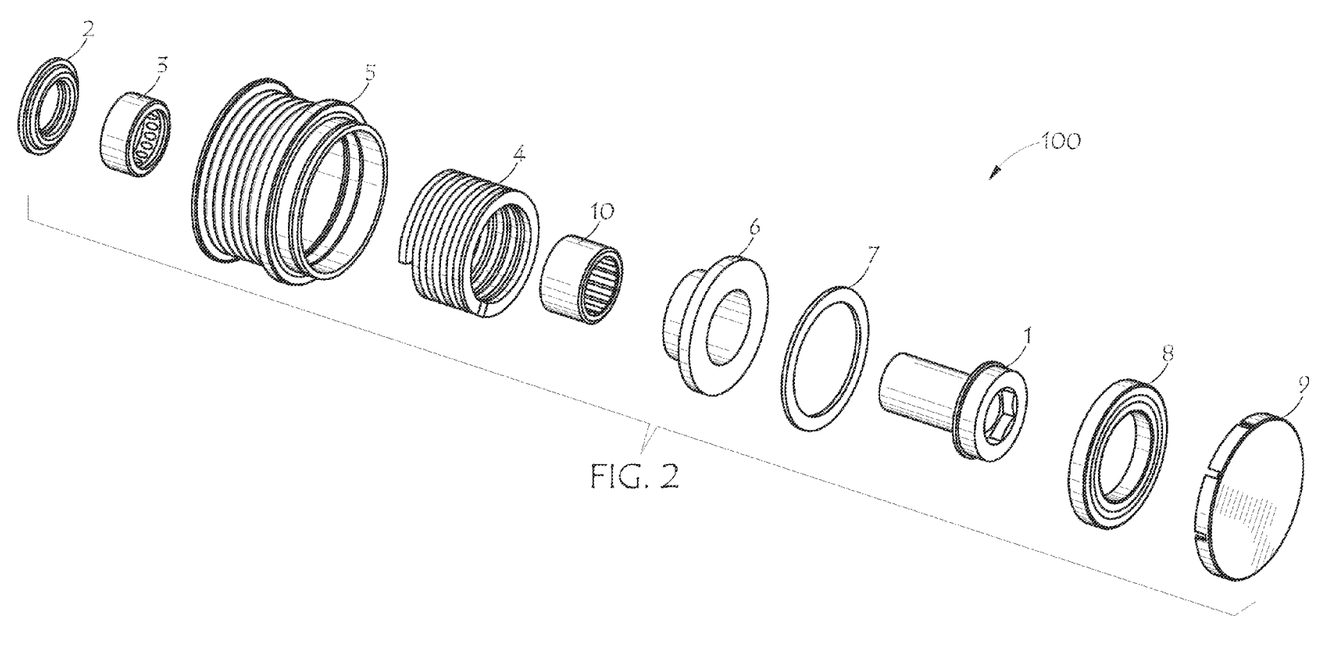
FIG. 2 is a blow-up perspective view of the device of FIG. 1.
Figure 3:
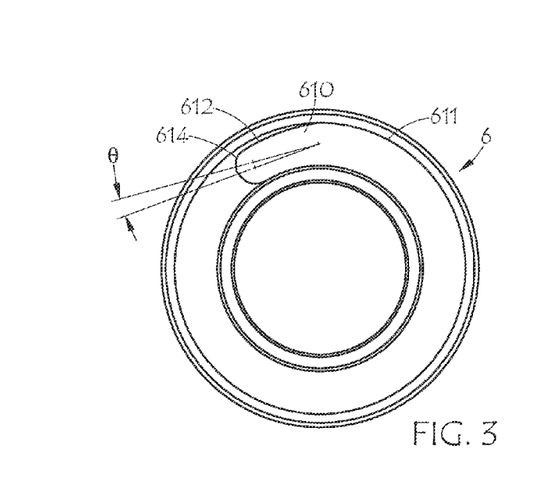
FIG. 3 is a plan view of a spring carrier with a wedge-shaped pocket.
Figures 4, 6:
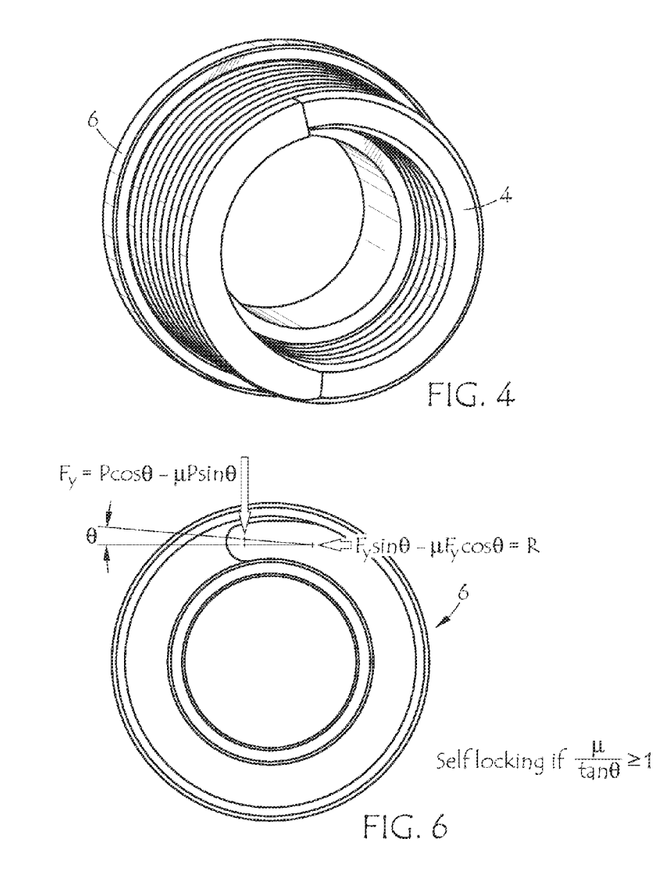
FIG. 4 is a perspective view of a spring in the spring carrier of FIG. 3.
FIG. 6 illustrates how a set wedge may resist release.
Figure 5:
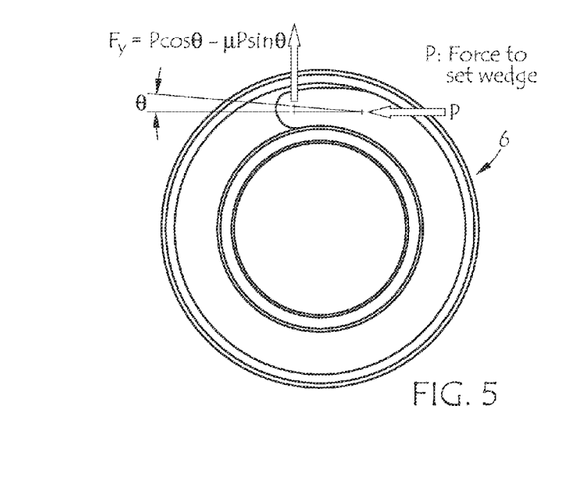
FIG. 5 illustrates mathematically how a wedge may be set.
Figure 20:
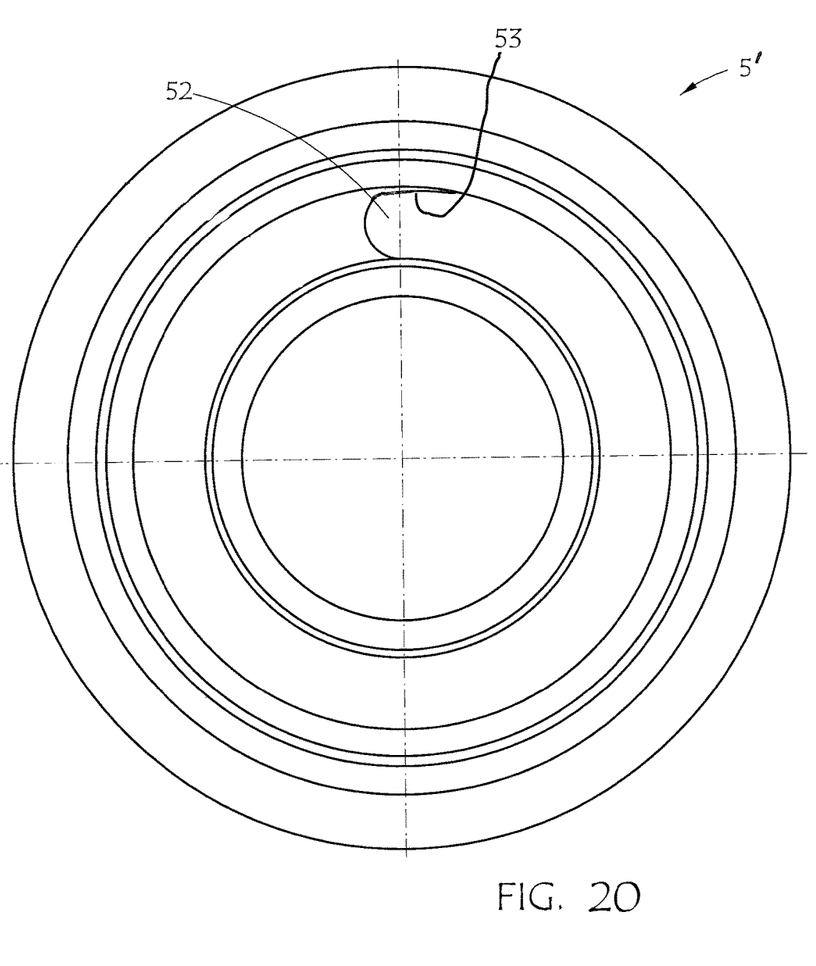
FIG. 20 is a plan view of a pulley with a wedge-shaped pocket.

FIG. 1 is a section view of one example of an accessory drive tuning device 100 according to an embodiment of the invention. FIG. 2 is an exploded view of the device 100 of FIG. 1. In FIGS. 1 and 2, the torsional spring 4 is housed in pulley 5 and spring carrier 6. FIG. 3 is a plan view of spring carrier 6 showing the spring pocket 610 with wedge taper 612. FIG. 4 is a perspective view of the spring 4 in the wedge in spring carrier 6. A similar wedge-shaped pocket 52 with radial wedge taper 53 for the opposite end of spring 4 may be included in pulley 5', as shown in FIG. 20. FIG. 5 illustrates how the wedge is set in terms of the setting force P, which biases the spring into the pocket, and the resulting wedging force Fy. FIG. 6 illustrates the resistance force R after it is set with the setting force P. The resistance force will hold the spring from moving out of the wedge. If R is less than or equal to Fy, then the spring will not pull free from the wedge. This condition results in Equation 1. If Equation 1 is met then the wedge will be self locking and hold the spring in place $$\mu/\tan\theta \geq 1 \qquad \text{Equation 1}$$

θ=Wedge angle
μ=Coefficient of friction

The other parts of the exemplary device 100 of FIGS. 1 and 2 may be described in more detail. Pulley 5 engages a belt (not shown) to drive a device such as an alternator. Pulley 5 houses ball bearing 8 and needle bearing 3 which allow relative motion between shaft 1 and pulley 5 while transferring the radial load to shaft 1. Pulley 5 is the input to the device and power flows from pulley 5 to one end of coil spring 4, then from the other end of spring 4 to spring carrier 6. Pulley 5 and spring carrier 6 each have a recess or pocket 610 machined therein with circular arc 611 to receive Spring 4. The start of circular arc 611 has radial taper 612 to retain the spring. The angle of radial taper 612 is such that it is a self locking wedge. The end 614 of the pocket would be the stop but for the wedge effect of taper 612. The device may include various covers, caps, seals, spacers, reinforcing rings or the like, such as covers 9 and 2 and ring 7 in FIGS. 1 and 2. Other optional device features include one-way clutch 10.

To illustrate how the design works as shown in FIG. 3 the wedge angle as shown is 5°. If we assume that pulley 5 and spring carrier 6 and spring 4 are made of steel and assume that the steel surfaces are lubricated such that the coefficient of friction is 0.15 then these conditions satisfy Equation 1 and the spring will stay in place unless it is pulled out by some other greater force.

Figure 7:
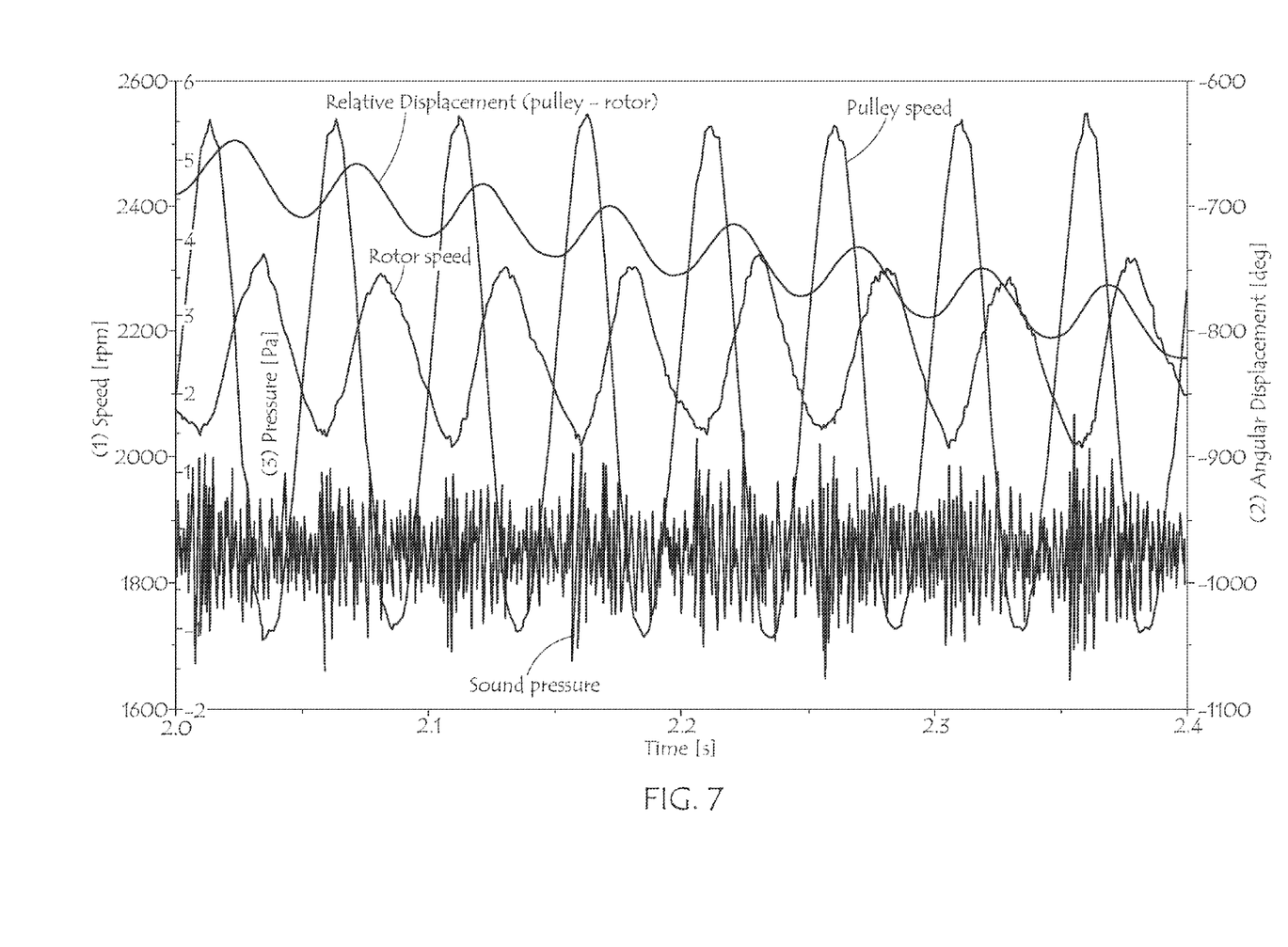
FIG. 7 illustrates mechanical and noise measurements on a device without a spring lock feature.
Figure 8:
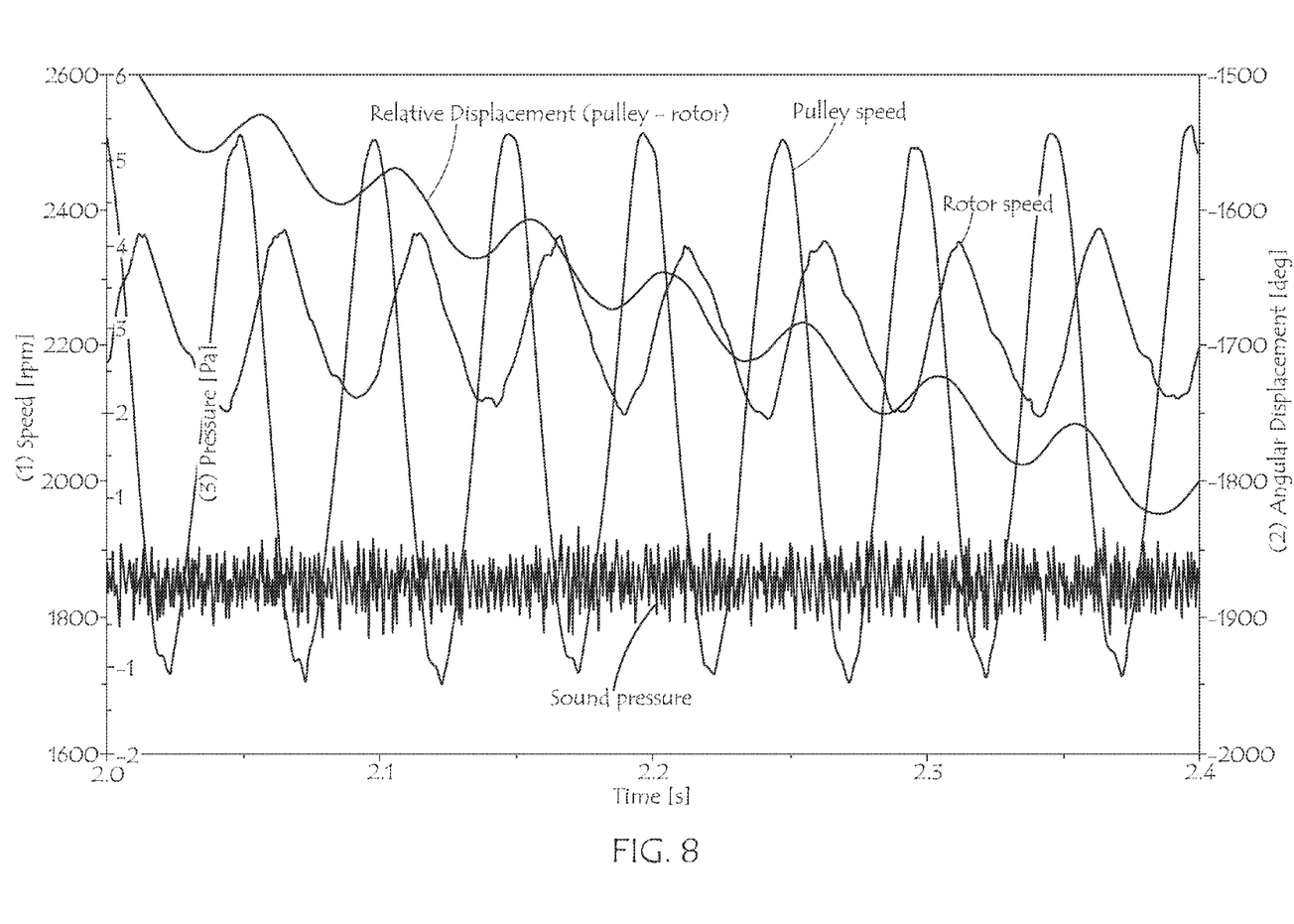
FIG. 8 illustrates mechanical and noise measurements on a device with a wedge-shaped spring lock feature according to an embodiment of the invention.

A prototype isolator decoupler with a torsional spring and with a spring carrier with a wedge-shaped pocket machined therein to function as a stop and catch for the spring end was constructed. The device included a one-way clutch device and was constructed to test the invention. The spring rattling problem was solved in the prototype. FIGS. 7 and 8 show the noise, pulley speed, and rotor speed with and without the wedge-shaped pocket. FIG. 7 is without the wedge-shaped pocket and FIG. 8 is with the wedge-shaped pocket. Comparing the measured noise level (sound pressure in Pa) from both FIGS. 7 and 8 it is clear that there is less noise with the wedge-shaped pocket. Further proof that the spring is not sliding out is the speed of the rotor. Both FIGS. 7 and 8 have the same input at the pulley and the rotor speed represents the output. The device with the wedge-shaped pocket has a higher rotor speed in comparison to the device without the wedge shaped pocket. The difference in speed is due to the spring sliding in and out of the pocket only in the device without the wedge shaped pocket.

Either or both sides of the pocket could be angled to form the wedge. The spring end could be tapered as well, but that is not necessary. The spring end could be tapered or wedge-shaped instead of the pocket. An advantage of the invention is that it is self-engaging and self-locking, so that if the forces increase so that a spring end disengages, the engagement force will generally increase also to engage the spring end in the wedge-shaped pocket even tighter than before it slipped out, thereby locking it in or stabilizing it for the higher force level.

Figure 21:
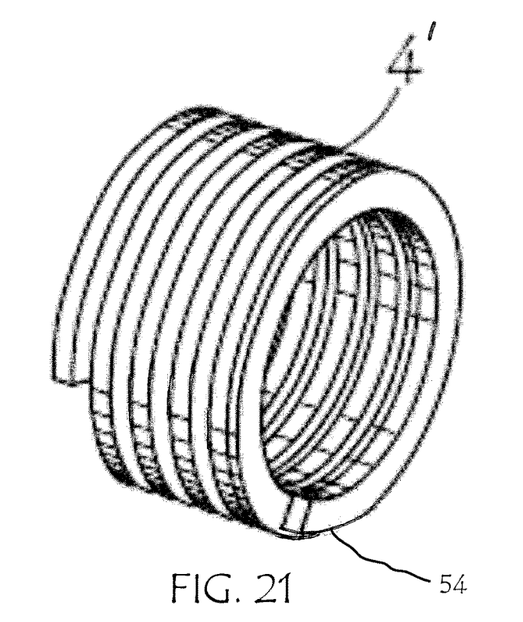
FIG. 21 is a perspective view of a spring with a wedge-shaped end.
Figure 22:
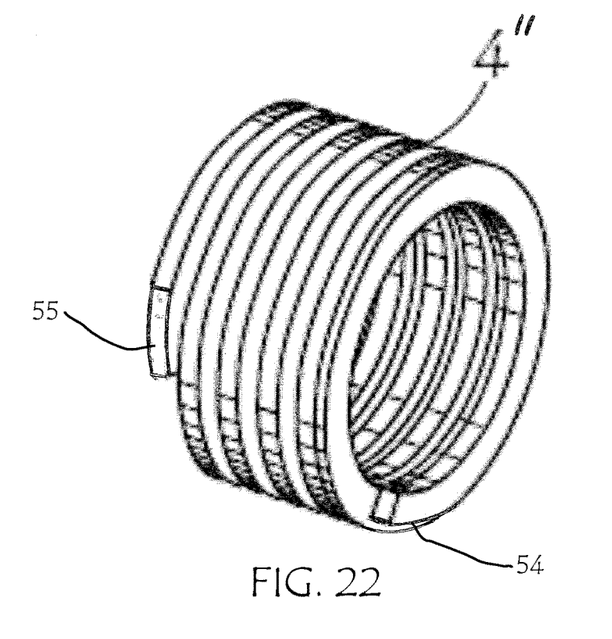
FIG. 22 is a perspective view of a spring with both ends wedge-shaped.

FIG. 21 shows spring 4' with a wedge-shaped end due to taper 54. FIG. 22 shows spring 4" with both ends wedge-shaped with taper 54 at one end and taper 55 at the other end.

Figure 9:
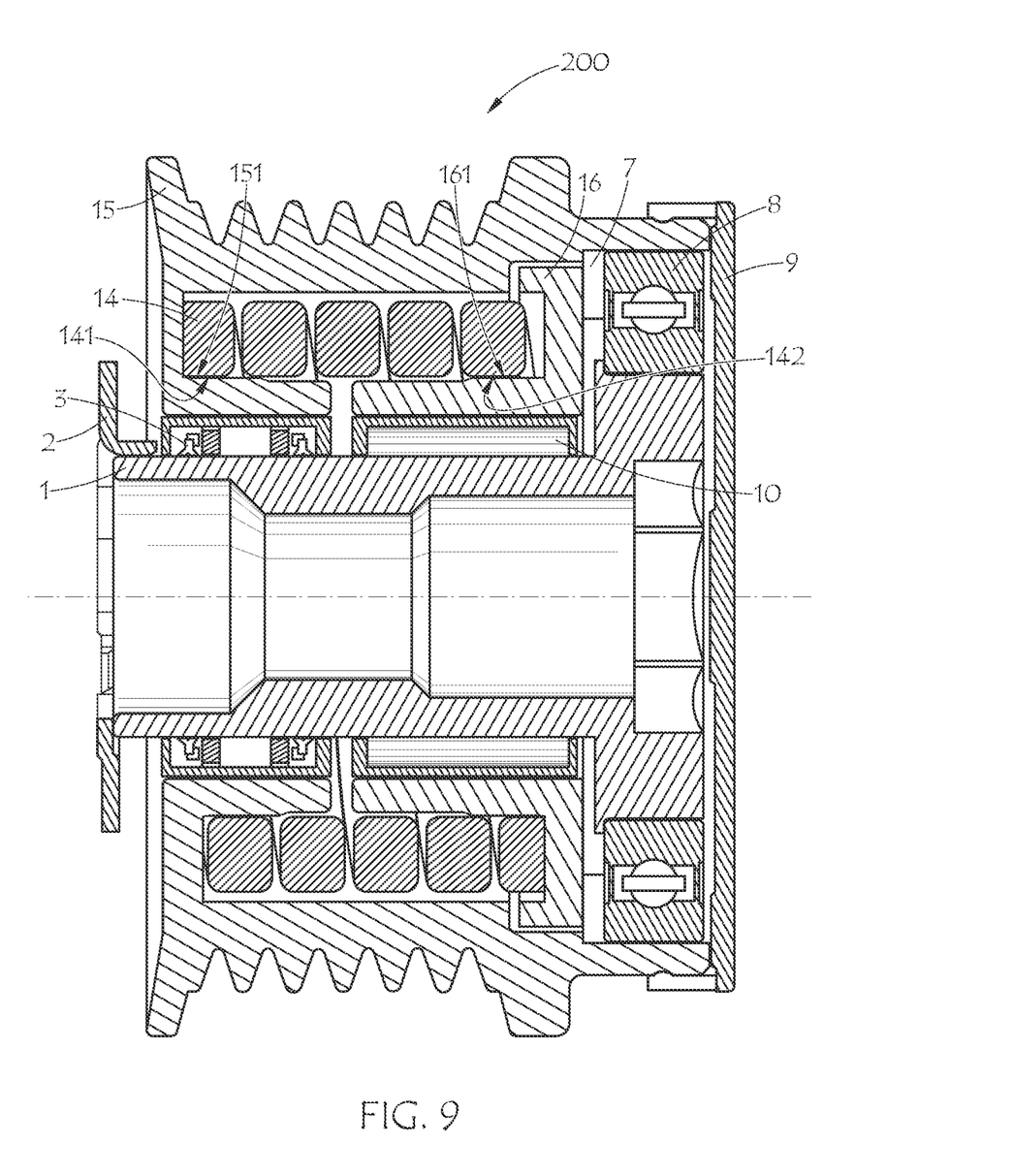
FIG. 9 is a section view of a device that uses an interference fit to the spring inner diameter to hold the spring in place according to an embodiment of the invention.
Figure 10:
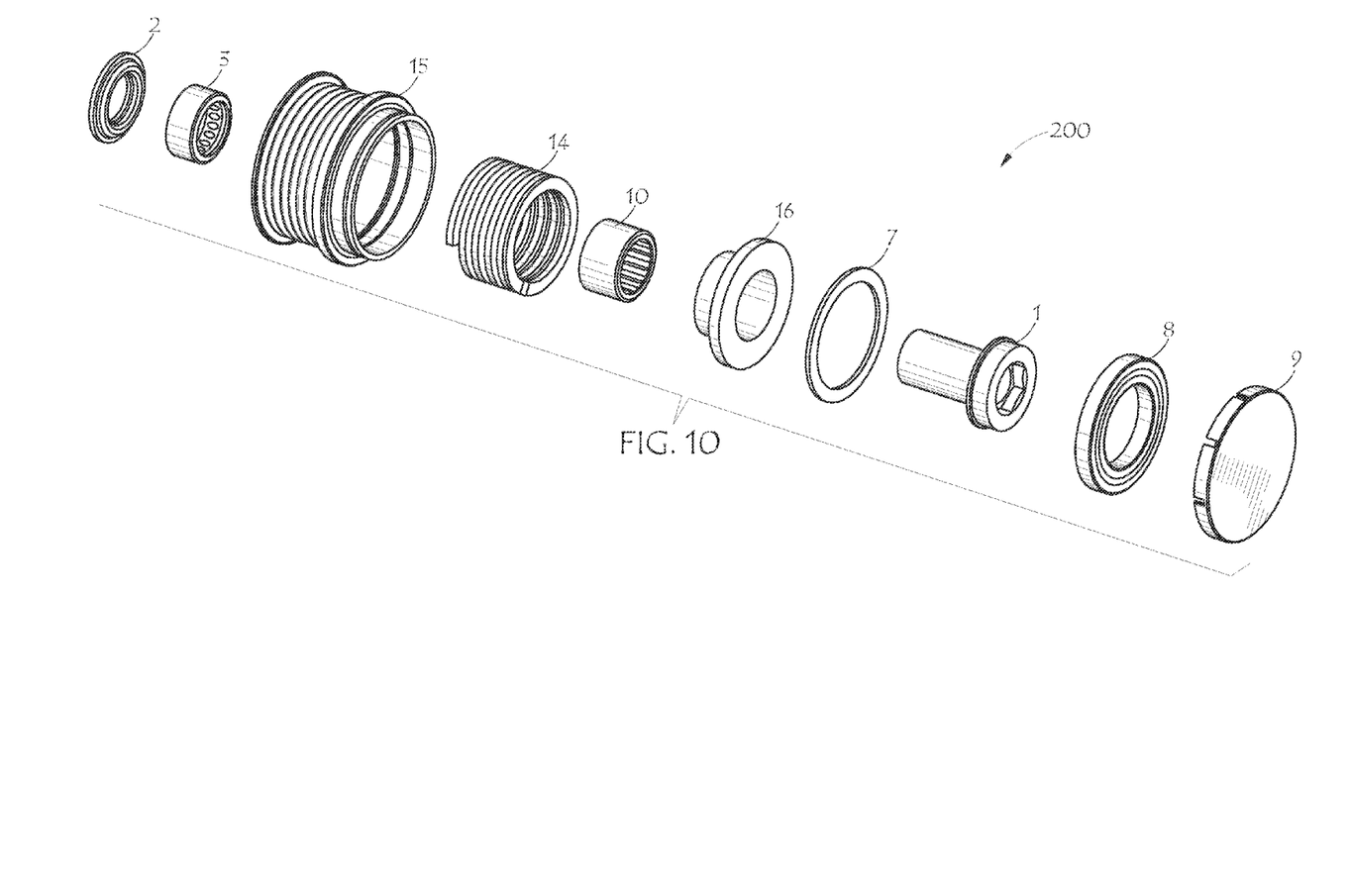
FIG. 10 is an exploded view of the device of FIG. 9.
Figure 11:
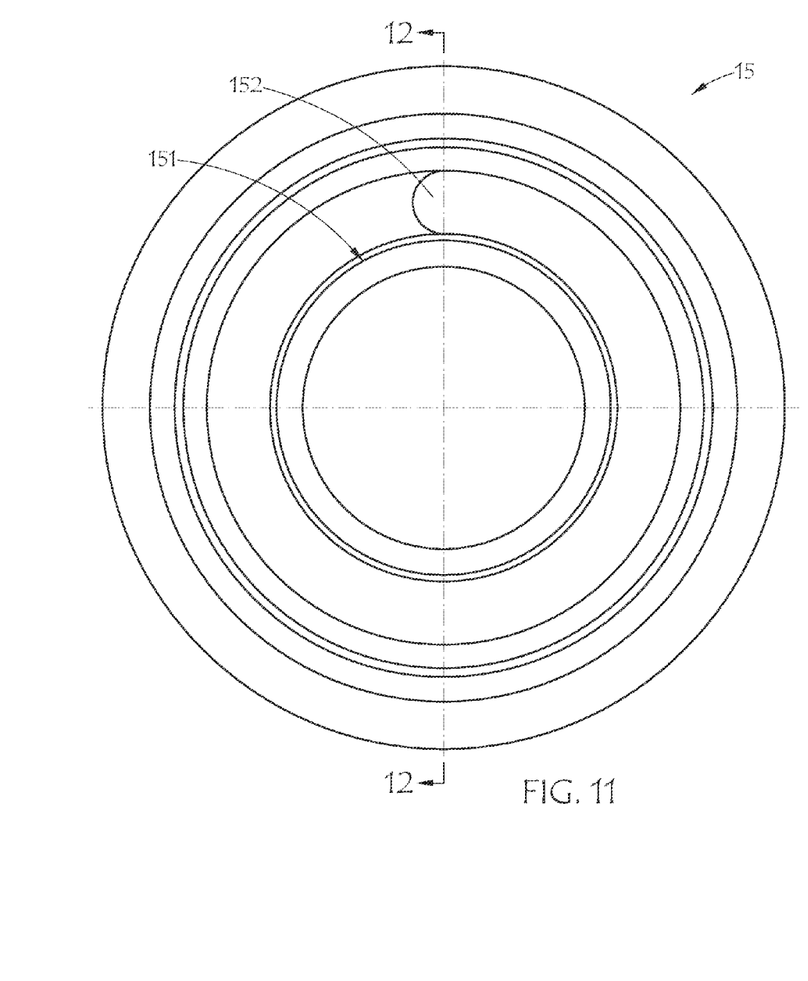
FIG. 11 shows a more detailed view of the pulley for the embodiment of FIG. 9.
Figure 12:
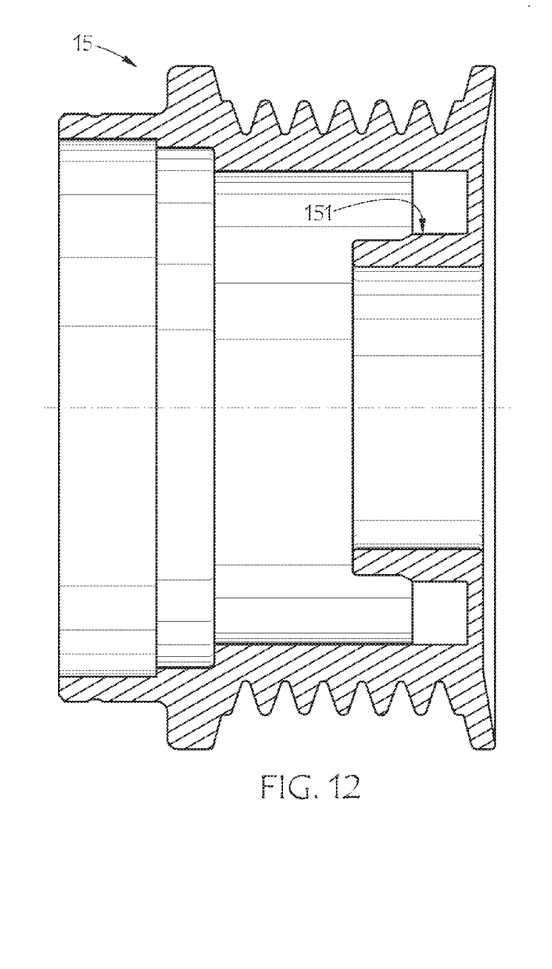
FIG. 12 shows a sectional view of the pulley of FIG. 11.
Figure 13:
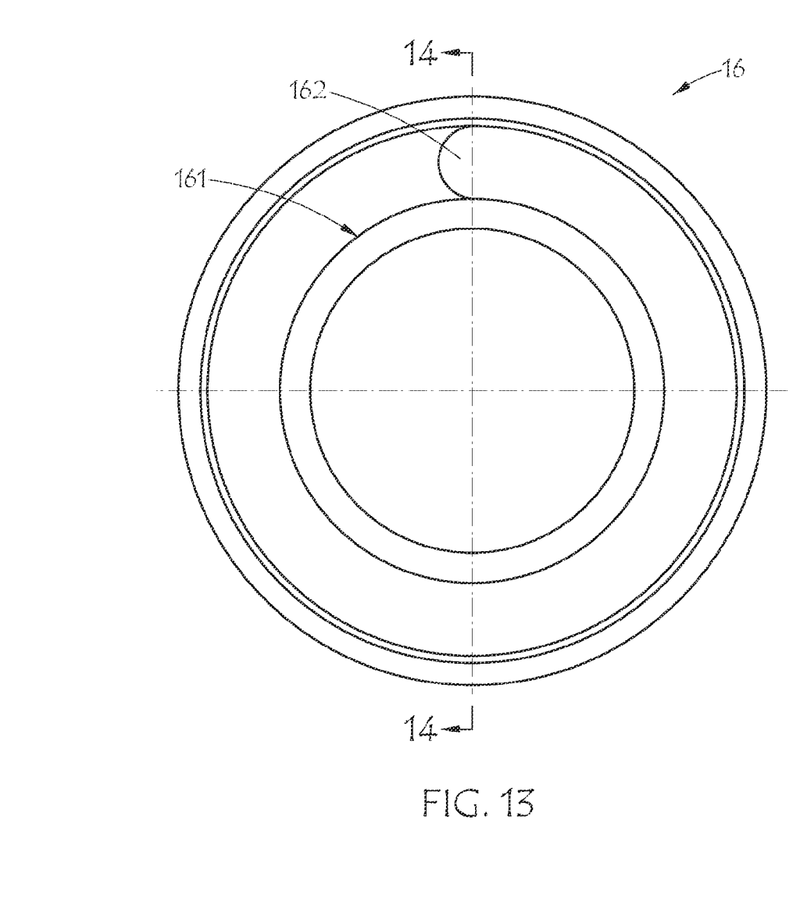
FIG. 13 shows a more detailed view of the clutch carrier for the embodiment of FIG. 9.
Figure 14:
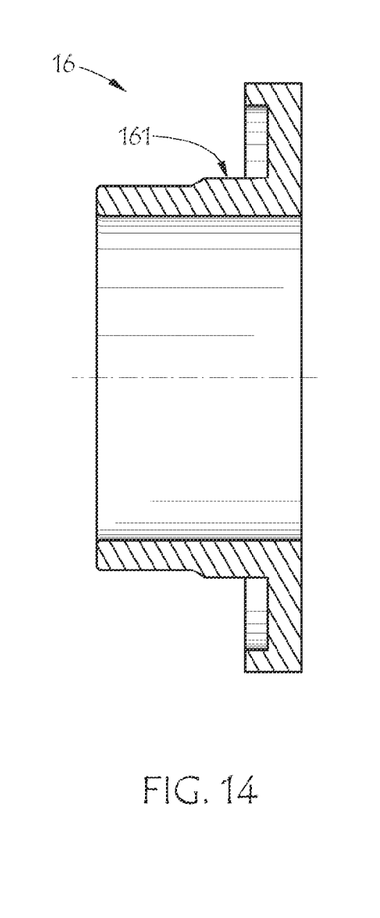
FIG. 14 shows a sectional view of the clutch carrier of FIG. 13.

FIG. 9 is a section view of accessory drive tuning device 200 that illustrates a second embodiment in which an interference fit to the spring inner diameter is used as a means to hold the spring in place. FIG. 10 is an exploded view of device 200. In FIGS. 9-10, parts numbered 1-3 and 7-10 are as described above for the first embodiment. As shown in FIGS. 9, 11 and 12, at least a portion of outer cylindrical surface 151 of pulley 15 is larger in diameter than inner diameter 141 of spring 14. This frictionally restrains spring 14 from sliding out of spring pocket 152 of pulley 15 which is shown in FIG. 11. The other end of spring 14 may be retained in a similar fashion. As shown in FIGS. 9, 13 and 14, at least a portion of outer cylindrical surface 161 of clutch carrier 16 is larger in diameter than spring inner diameter 142 of spring 14. This frictionally restrains spring 14 from sliding out of spring pocket 162 which is shown in FIG. 13.

Figure 15:
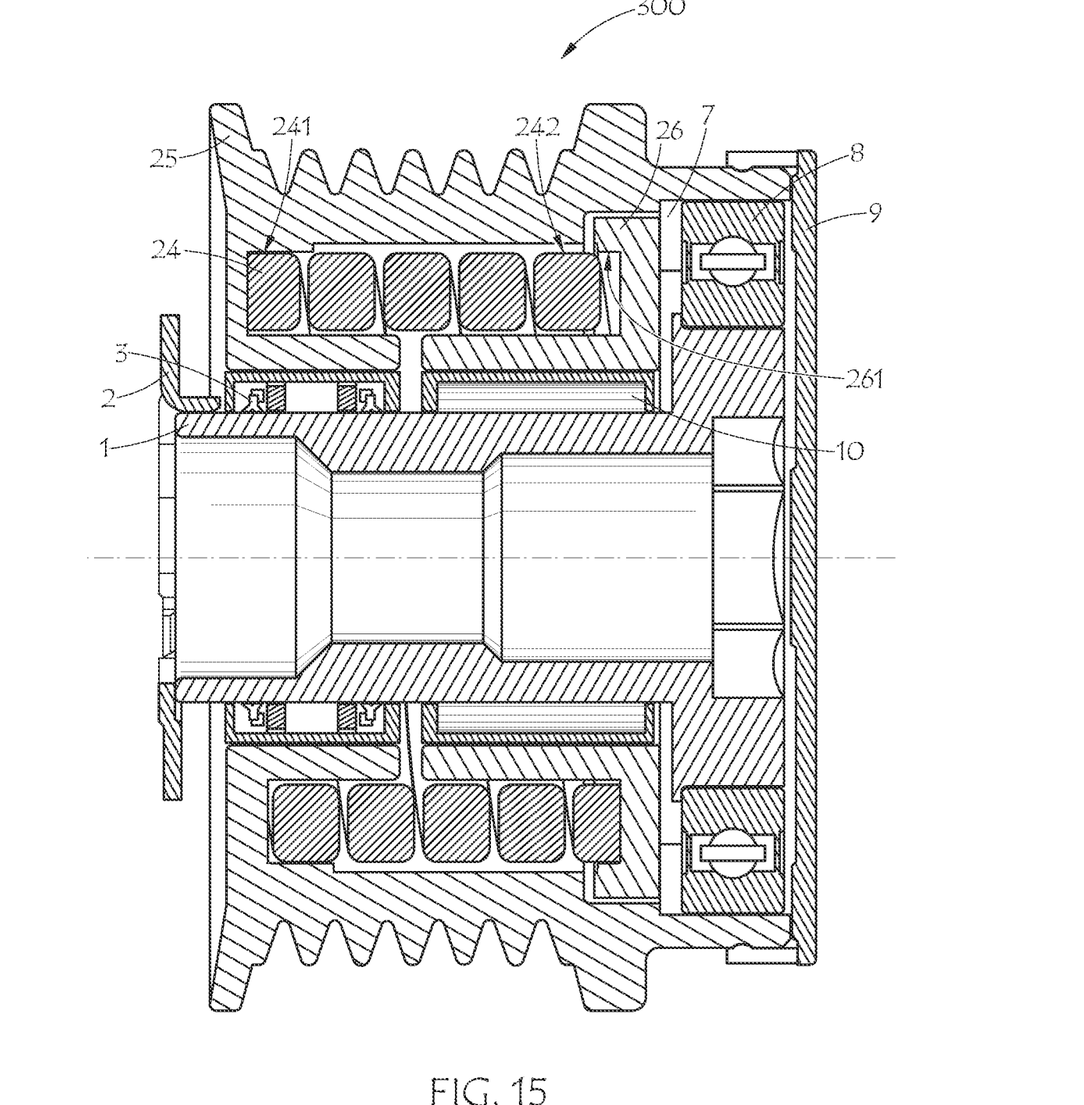
FIG. 15 is a section view of a device that uses an interference fit to the spring outer diameter to hold the spring in place according to an embodiment of the invention.
Figure 16:
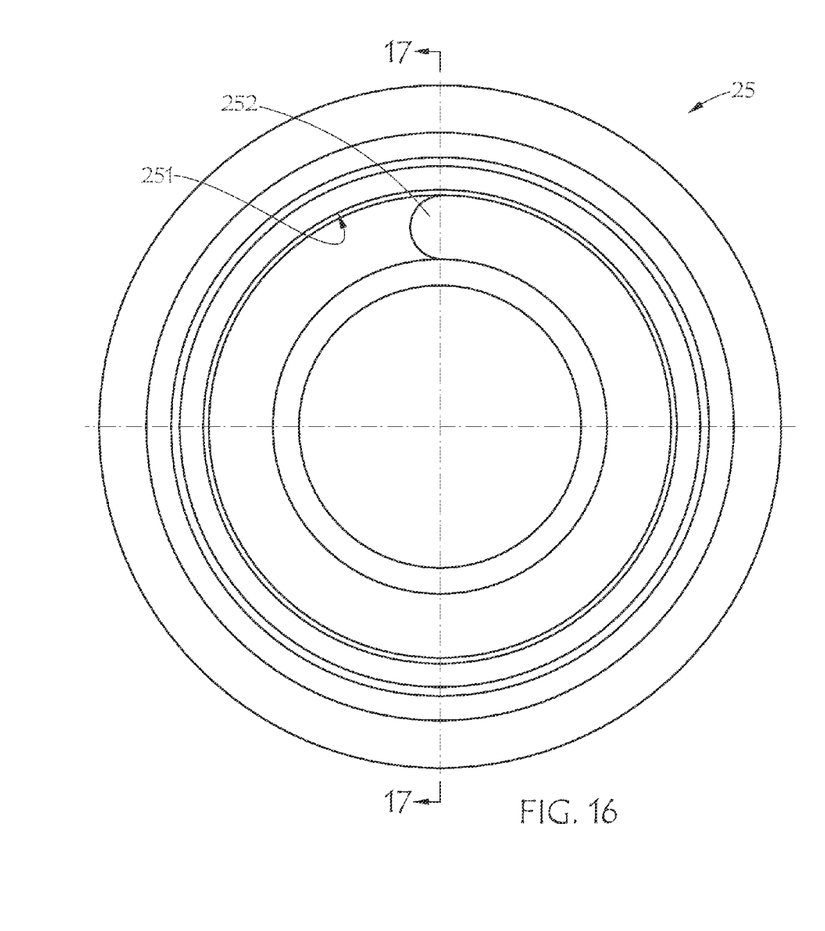
FIG. 16 shows a more detailed view of the pulley for the device of FIG. 15.
Figure 17:
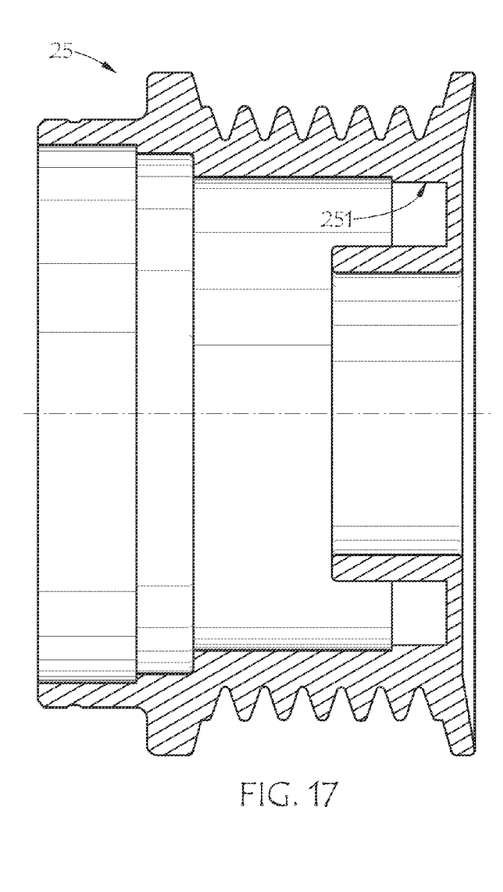
FIG. 17 shows a sectional view of the pulley of FIG. 16.
Figure 18:
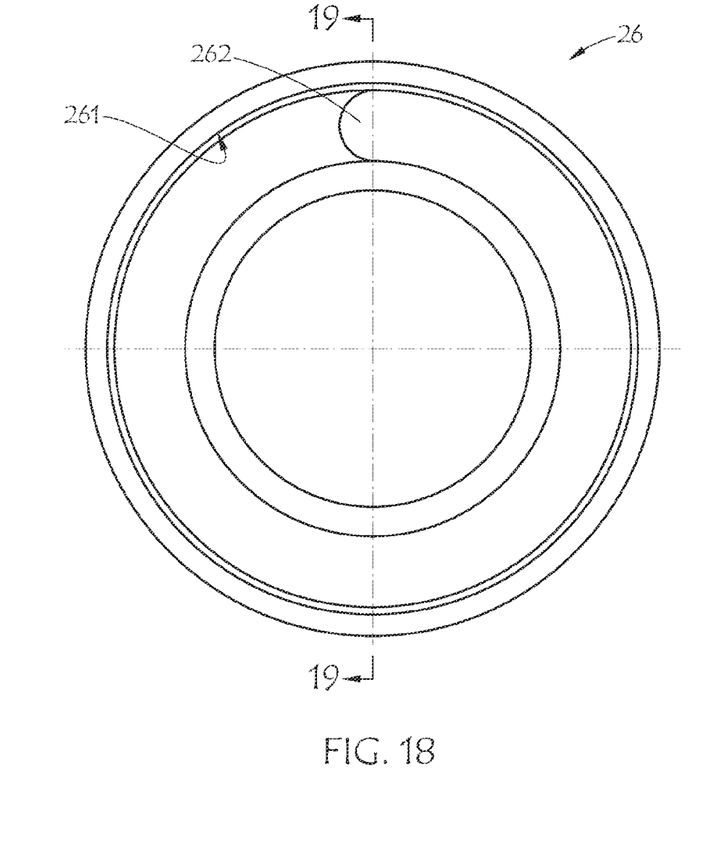
FIG. 18 shows a more detailed view of the clutch carrier for the device of FIG. 15.
Figure 19:
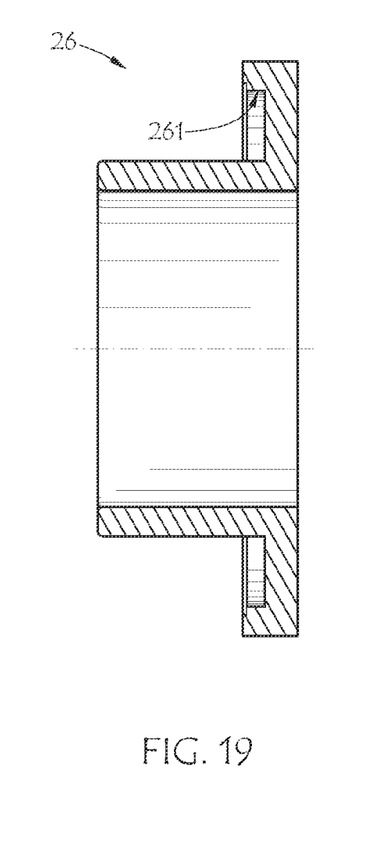
FIG. 19 shows a sectional view of the clutch carrier of FIG. 18.

FIG. 15 is a section view of accessory drive tuning device 300 that illustrates a third embodiment where an interference fit to the spring outer diameter is used as a means to hold the spring in place. As shown in FIGS. 15-17, at least a portion of inner cylindrical surface 251 of pulley 25 is smaller in diameter than outer diameter 241 of spring 24. This holds spring 24 from sliding out of spring pocket 252 of pulley 25 which is shown in FIG. 16. The other end of spring 24 may be retained in a similar fashion or via one of the other embodiments described herein. As shown in FIGS. 15, 18 and 19, at least a portion of inner cylindrical surface 261 of clutch carrier 26 is smaller in diameter than spring outer diameter 242 of spring 24. This frictionally restrains spring 24 from sliding out of spring pocket 262 which is shown in FIG. 18.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. An isolator decoupler comprising:
a torsional spring;
a spring carrier with a first wedge-shaped pocket defining a radial taper machined therein that engages an end of said torsional spring; and
a pulley with a second wedge-shaped pocket defining a radial taper that engages an other end of said torsional spring,
wherein both ends of said torsional spring engage in respective said wedge-shaped pockets, and wherein said engagement is by friction when the end of said torsional spring is wedged into respective said wedge-shaped pocket.

2. The isolator decoupler of claim 1 wherein at least one said end of said torsional spring is tapered.

3. The isolator decoupler of claim 1 wherein the taper is such that the engagement comprises self-locking wedging engagement.

4. An isolator decoupler comprising:
a torsional spring having a radially tapered first end;
a spring carrier with a first pocket machined therein that engages said tapered first end of said torsional spring; and
a pulley with a second pocket machined therein that engages a tapered second end of said torsional spring,
wherein both ends of said torsional spring engage by wedging in respective said pockets, and wherein said engagement is by friction when the end of said torsional spring is wedged into respective said pocket.

5. The isolator decoupler of claim 4 wherein at least one of said first pocket and said second pocket is wedge shaped having a radial taper.

6. The isolator decoupler of claim 4 wherein the engaging comprises a self-locking wedging engagement.

7. An accessory drive tuning device comprising:
a torsional spring having a spring end having inner and outer diameters; and
a spring carrier having a pocket having inner and outer cylindrical surfaces and an end surface, said pocket arranged to accept said spring end therein;
wherein said spring end is frictionally restrained in said pocket due to a wedging engagement of said inner and outer diameters of said spring end between said inner and outer cylindrical surfaces of said pocket; and
wherein the wedging engagement is self-locking.

8. The accessory drive tuning device of claim 7 wherein said spring end is wedge shaped.

9. The accessory drive tuning device of claim 7 wherein said pocket is wedge shaped.

10. The accessory drive tuning device of claim 9 wherein said wedge shape is defined by a radial taper at the start of a circular arc defined by at least one of said cylindrical surfaces in the proximity of the end surface of the pocket.

11. An accessory drive tuning device comprising:
a torsional spring having a spring end having inner and outer diameters; and
a spring carrier having a pocket having an end surface, and having radially inner and radially outer circumferential side surfaces at least one of which defines a circular arc, said pocket arranged to accept said spring end therein;
wherein said spring end is frictionally restrained in said pocket due to a self-locking wedging engagement of said inner and outer diameters of said spring end between said inner and outer circumferential side surfaces of said pocket.

* * * * *